Oct. 17, 1950     A. R. LABUNDE     2,526,240
FISHHOOK
Filed Oct. 26, 1949
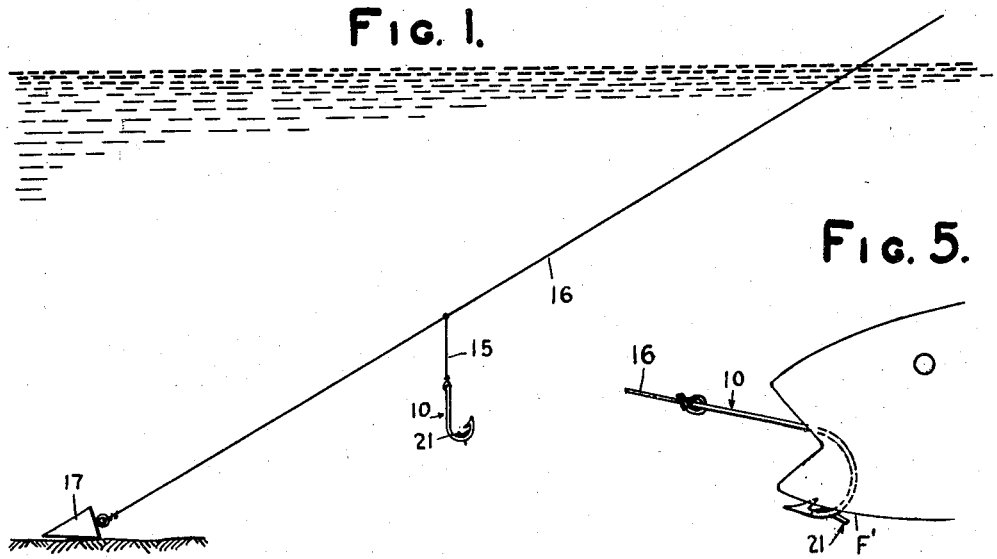
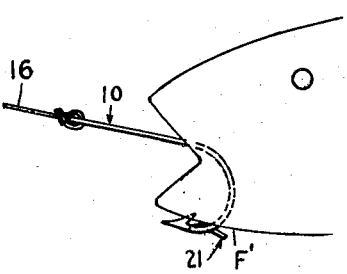
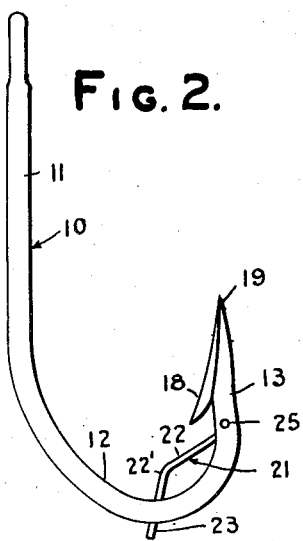
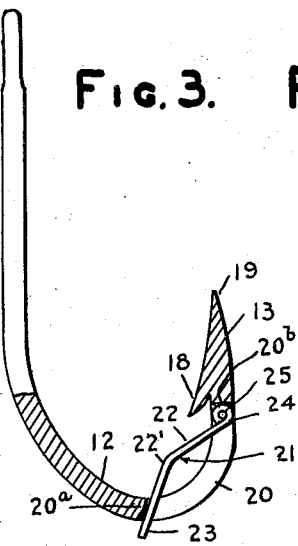
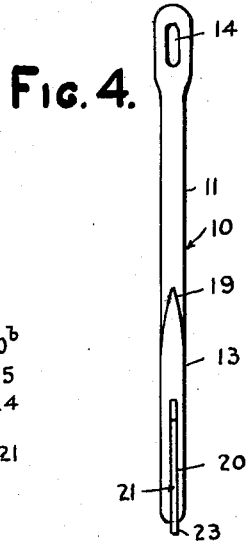
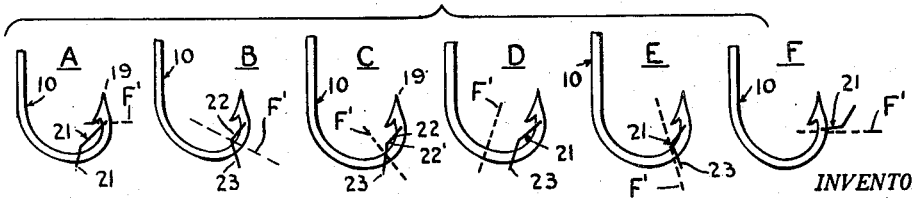
Fig. 6.
INVENTOR.
ARTHUR R. LABUNDE
BY
ATTORNEY Patented Oct. 17, 1950

2,526,240

UNITED STATES PATENT OFFICE 2,526,240

FISHHOOK

Arthur R. Labunde, Marlboro, N. J.

Application October 26, 1949, Serial No. 123,660

2 Claims. (Cl. 43—43.16)

My invention relates to fish hooks.

An important object of the invention is to provide a fish hook having a movable stop-lever or trigger, constructed and arranged so that it will not interfere with the hook entering the mouth of the fish and passing through a portion of the fish, but will positively prevent the fish from freeing itself from the hook.

A further object of the invention is to provide a hook of the above mentioned character which is relatively simple in construction and extremely reliable in operation.

Other objects and advantages of the invention will be apparent during the course of the following description.

In the accompanying drawings, forming a part of this application, and in which like numerals are employed to designate like parts throughout the same, Figure 1 is a side elevation of a hook embodying my invention, showing the same suspended from a line, Figure 2 is a side elevation, upon an enlarged scale, of my improved fish hook, Figure 3 is a similar view, parts in vertical section, Figure 4 is an edge elevation of the fish hook, Figure 5 is a side elevation of the fish hook with the fish caught thereon, and, Figure 6 is a side elevation, partly diagrammatic, illustrating the various positions of the stop-lever, in the operation of the device.

In the drawings, where for the purpose of illustration is shown a preferred example of my invention, the numeral 10 designates a generally U-shaped fish hook formed of metal or the like. This fish hook includes a long side 11, carrying a curved portion 12, to which is secured a short side 13. At its free end, the long side 11 has an eye 14 for attachment to a flexible element 15, secured to a line 16, attached to the usual weight 17. The short side 13 is provided with the usual lateral projection or barb 18, and point 19.

The curved portion 12 and short side 13 have a longitudinal slot 20 formed therein, to receive a stop lever or trigger 21, which is generally V-shaped and includes inner and outer arms 22 and 23, which diverge. The arm 22 is bent at its free end to provide an eye 24, pivotally mounted upon a transverse pin 25, secured to the short side 13. When the stop lever 21 is in its innermost position, the arm 23 contacts with the end wall 20a of the slot 20, thus limiting the movement of the stop-lever in that direction. When the stop-lever 21 is in the innermost position, Figure 3, its outer arm 23 is arranged substantially at a right angle to the curved portion 12, and the outer end of the arm 23 projects a short distance beyond the curved portion. The arm 22 is now inclined or diagonally arranged with respect to the short side 13 of the hook.

In use, if the hook is substantially vertically suspended, the stop-lever 21 will assume generally the innermost position shown in Figure 3. The stop-lever may be held in this position by the bait applied to the hook.

With the parts arranged as shown in Figures 2 and 3, when the fish takes the hook, the pointed end 19 of the hook passes through a portion F' of the fish, such portion passing longitudinally over the side 13 to assume a position behind the barb 18. This is shown in Figure 6, at A. At B, in this figure, the fish part F' has moved for a greater distance upon the short side of the hook and contacts with the diagonally arranged inner arm 22, which will swing outwardly until it becomes parallel with the side 13. The fish part F' continuing to move upon the curved portion 12, passes behind the shoulder 22' while the fish part is still in advance of the free end of the arm 23. Further rearward movement of the fish part F' from the position at C, to the position at D, causes the fish part to swing the arm 23 to the innermost position, and the fish part passes behind this arm 23. If the fish attempts to free itself from the hook, the fish part F' will engage behind the arm 23, first swinging the stop-lever 21 to the intermediate outer position, at E, Figure 6, and further forward movement of the fish part swings the stop-lever 21 to the completely opened position, F, Figure 6. When the stop-lever 21 is in the completely opened position, it engages the end wall 20b of the slot 20. It is thus seen that when the stop-lever is moved to the outer position, in whole or in part, it will prevent the escape of the fish from the hook.

It is to be understood that the form of the invention herewith shown and described is to be taken as a preferred example of the same, and that various changes in the shape, size and arrangement of parts may be resorted to without departing from the spirit of the invention or the scope of the subjoined claims.

Having thus described my invention, I claim:

1. A fish hook, comprising opposed sides and a curved intermediate portion connecting the sides, one side having means for attachment to a flexible element, the other side being provided with a free pointed end and a barb, the curved portion and last named side having a longitutdinal slot, one end wall of the slot being arranged adjacent to the barb and the other end wall being formed in the curved portion at a point remote from the barb and laterally spaced therefrom, a generally V-shaped stop-lever including diverging inner and outer arms, the stop-lever operating within the slot, and means to pivotally mount the free end of the inner arm upon the last named side adjacent to the end wall of the slot, the outer arm of the stop-lever being adapted to contact with the opposite end wall of the slot, the inner arm being then diagonally arranged with respect to the last named side and the outer arm extending transversely of the curved portion.

2. A fish hook, comprising opposed sides and a curved portion connecting the sides, one side having means for attachment to a flexible element, the other side having its free end pointed, the last named side and curved portion having a longitudinal slot, a generally V-shaped stop-lever operating within the slot and including diverging inner and outer arms, and a pin pivotally connecting the free end of the inner arm with the last named side adjacent to one end wall of the slot, the outer arm being adapted to contact with the opposite end wall of the slot.

ARTHUR R. LABUNDE.

REFERENCES CITED

The following references are of record in the file of this patent:

UNITED STATES PATENTS

| Number | Name | Date |
|---|---|---|
| 595,995 | Dreese | Dec. 21, 1897 |
| 802,445 | Evans | Oct. 24, 1905 |